US009967925B2

(12) United States Patent
Brill (10) Patent No.: US 9,967,925 B2
(45) Date of Patent: May 8, 2018

(54) RF OVEN WITH INVERTED F ANTENNA (71) Applicant: GOJI LIMITED, Hamilton (BM)

(72) Inventor: Yishai Brill, Beer Sheva (IL)

(73) Assignee: GOJI LIMITED, Hamilton (BM)

( * ) Notice: Subject to any disclaimer, the term of this patent is extended or adjusted under 35 U.S.C. 154(b) by 438 days.

(21) Appl. No.: 14/427,739

(22) PCT Filed: Sep. 12, 2013

(86) PCT No.: PCT/IB2013/002748
§ 371 (c)(1),
(2) Date: Mar. 12, 2015

(87) PCT Pub. No.: WO2014/041430
PCT Pub. Date: Mar. 20, 2014

(65) Prior Publication Data
US 2015/0245424 A1    Aug. 27, 2015

Related U.S. Application Data (60) Provisional application No. 61/700,478, filed on Sep. 13, 2012.

(51) Int. Cl.
*H05B 6/72* (2006.01)
*H01Q 1/38* (2006.01)
(Continued)

(52) U.S. Cl.
CPC .................. *H05B 6/72* (2013.01); *H01Q 1/36* (2013.01); *H01Q 1/48* (2013.01); *H01Q 9/42* (2013.01);
(Continued)

(58) Field of Classification Search
CPC .......... H05B 6/688; H05B 6/705; H05B 6/72; H05B 6/70; H01Q 9/42; H01Q 1/48; H01Q 1/36; Y02B 40/146
(Continued)

(56) References Cited

U.S. PATENT DOCUMENTS 3,366,769 A    1/1968 Lima
5,966,097 A    10/1999 Fukasawa et al.
(Continued)

FOREIGN PATENT DOCUMENTS

FR    2749438    12/1997
JP    2001-148283    5/2001
WO    2012/030054    3/2012

OTHER PUBLICATIONS

International Preliminary Report on Patentability for PCT Application PCT/IB2013/002748 dated Mar. 17, 2015.
(Continued)

*Primary Examiner* — Quang Van
(74) *Attorney, Agent, or Firm* — Greenblum & Bernstein, P.L.C.

(57) ABSTRACT

A radiating element is provided for applying electromagnetic energy to a cavity. The radiating element includes a feeding section and a grounding section, wherein the feeding section and the grounding section extend substantially within a first plane. The radiating element also includes a radiating section in electrical communication with the feeding section and the grounding section, wherein the radiating section includes at least one bend between the feeding section and a distal end of the radiating section, the at least one bend extending in a second plane different from the first plane.

35 Claims, 6 Drawing Sheets

(51) Int. Cl.
  *H01Q 9/42*   (2006.01)
  *H05B 6/70*   (2006.01)
  *H05B 6/68*   (2006.01)
  *H01Q 1/36*   (2006.01)
  *H01Q 1/48*   (2006.01)

(52) U.S. Cl.
  CPC .............. *H05B 6/688* (2013.01); *H05B 6/70* (2013.01); *H05B 6/705* (2013.01); *Y02B 40/146* (2013.01)

(58) Field of Classification Search
  USPC ....... 219/748, 709, 750, 438, 490, 600, 660; 343/700 MS, 767, 770, 702, 853, 872, 343/846, 848, 818
  See application file for complete search history.

(56) References Cited

U.S. PATENT DOCUMENTS

| | | | |
|---|---|---|---|
| 6,392,600 B1 * | 5/2002 | Carson | H01Q 1/246 343/700 MS |
| 8,839,527 B2 | 9/2014 | Ben-Shmuel et al. | |
| 9,040,879 B2 | 5/2015 | Libman et al. | |
| 2003/0122718 A1 | 7/2003 | Fang | |
| 2009/0057302 A1 | 3/2009 | Ben-Shmuel et al. | |
| 2012/0038537 A1 | 2/2012 | Yamamoto et al. | |
| 2012/0103973 A1 | 5/2012 | Rogers | |
| 2013/0080098 A1 | 3/2013 | Hadad et al. | |
| 2013/0200066 A1 | 8/2013 | Gelbart et al. | |
| 2013/0284728 A1 | 10/2013 | Moon et al. | |
| 2013/0306627 A1 | 11/2013 | Libman et al. | |
| 2014/0247060 A1 | 9/2014 | Ben Haim et al. | |
| 2014/0287100 A1 | 9/2014 | Libman | |
| 2015/0034632 A1 | 2/2015 | Brill et al. | |
| 2015/0070029 A1 | 3/2015 | Libman et al. | |
| 2015/0156827 A1 | 6/2015 | Ibragimov et al. | |

OTHER PUBLICATIONS

International Search Report for PCT Application PCT/IB2013/002748 dated Jul. 21, 2014.
Abstract of U.S. Pat. No. 5,966,097 of Oct. 12, 1999.

* cited by examiner

RF OVEN WITH INVERTED F ANTENNA

This application claims priority to U.S. Provisional Application No. 61/700,478, filed on Sep. 13, 2012, the disclosure of which is expressly incorporated herein by reference in its entirety.

TECHNICAL FIELD

The present disclosure relates to an apparatus for heating objects by application of electromagnetic energy in the radio frequency (RF) range and more particularly, but not exclusively, to an antenna configured to apply electromagnetic energy radio frequency energy) to a cavity and/or to a heating apparatus (e.g., a microwave oven) comprising such antenna.

BACKGROUND

Inverted F antennas are traditionally used in the field of communication. An inverted F antenna (IFA) typically includes a rectangular planar element located above a ground plane, a short circuiting plate or pin, and a feeding mechanism for the rectangular planar element. IFA is a variant of monopole antenna where the top section is folded down to be parallel with the ground plane. The folding is to reduce the height of the antenna, while maintaining a resonant trace length. The parallel section essentially introduces a capacitive load to the input impedance of the antenna, which is compensated by implementing a short-circuit stub. One end of the stub is normally connected to the ground plane.

Electromagnetic energy (e.g., microwave energy) has been used in various applications to supply energy to objects. For example, a microwave oven heats food using microwave energy. Microwave energy is usually transferred into a microwave cavity via waveguides. When electromagnetic energy is to be transferred by an energy radiating device (e.g., an antenna) into a cavity to process an object placed in the cavity, it may be desirable to maintain good coupling between the energy radiating device and the cavity containing the object in order to achieve high efficiency.

SUMMARY

Some embodiments of the invention may include an apparatus for processing an object by application of RF energy of a certain frequency range to a cavity holding the object. The cavity may support standing and/or travelling electromagnetic waves in the frequency range at which the RF energy is applied. The apparatus may include the cavity; and a radiating element for applying the electromagnetic energy from a power feed to the cavity. The radiating element may reside inside the cavity. The radiating element may include a feeding section; a grounding section; and a radiating section. The feeding section and the grounding section may extend substantially within a first plane. The radiating section may be in electrical communication with the feeding section and the grounding section. In some embodiments, the radiating section may include at least one bend between the feeding section and a distal end of the radiating section. The at least one bend may extend in a second plane different from the first plane. In some embodiments, the first and second planes are substantially perpendicular to each other.

Some embodiments of the invention may include a radiating element for applying radio frequency (RF) energy for processing an object placed in a cavity. The radiating element may comprise a feeding section, a grounding section, and a radiating section. The feeding section and the grounding section may extend substantially within a first plane. The radiating section may be in electrical communication with the feeding section and the grounding section, wherein the radiating section may include at least one bend between the feeding section and a distal end of the radiating section. The at least one bend may extend in a second plane different from the first plane. The radiating element may be described as having a modified inverted F antenna structure. As used herein, a modified inverted F antenna refers to an antenna having at least one modification to the shape, size, orientation, material, electrical properties, mechanical properties, and/or control/driving method of the basic inverted F antenna.

Some other aspects of the invention may include a radiating element having the feeding and grounding sections disclosed above. Additionally, the radiating element may have a radiating section in electrical communication with the feeding section and the grounding section, the radiating section comprising at least one bend configured to change a direction of an electrical current flowing in the radiating section such that the electrical current flows within a second plane different from the first plane. The radiating element may also be described as having a modified inverted F antenna structure.

In some embodiments, at least one radiating element having a modified inverted F antenna structure may be located in a cavity for processing an object using electromagnetic energy (e.g., RF energy). The at least one radiating element may be configured to receive electromagnetic energy from one or more sources and may radiate electromagnetic waves (e.g., at a plurality of frequencies, at a plurality of phases and/or at one or more amplitudes) into the cavity. In some embodiments, the cavity may comprise a plurality of radiating elements, each configured to receive electromagnetic energy from one or more sources and radiate electromagnetic waves having a plurality of frequencies. The plurality of radiating elements may be of the same structure and/or dimensions or may have different structures and/or dimensions. The plurality of radiating elements may radiate electromagnetic waves having the same bandwidth or different bandwidths. In some embodiments, a phase difference may be applied to at least two radiating elements from the plurality of radiating elements. In some embodiments, RF energy application may be controlled by a processor. The processor may be configured to control the electromagnetic energy supplied from the one or more sources to the radiating elements and control the radiating elements to radiate electromagnetic waves (e.g., having a plurality of frequencies). In some embodiments, the processor may determine a phase difference between two radiating elements radiating electromagnetic waves having the same frequency. In some embodiments, the processor may determine the phase difference and/or the emitting frequency according to an EM feedback received from the cavity.

DESCRIPTION OF EXEMPLARY EMBODIMENTS

Reference will now be made in detail to exemplary embodiments of the invention, examples of which are illustrated in the accompanying drawings. When appropriate, the same reference numbers are used throughout the drawings to refer to the same or like parts.

Some aspects of the invention may involve applying (e.g., emitting, radiating) RF energy within a certain frequency range into a cavity. A cavity may be any void or volume configured to support the excitation of electromagnetic (EM) modes (e.g., patterns of EM fields) at frequencies within the applied frequency range. The cavity may include walls that define the cavity boundaries. The walls may include bottom, ceiling, and side walls. In some embodiments, the cavity walls may comprise a material opaque to RF energy and/or capable of reflecting RF energy. For example, the cavity walls may be constructed from any conductive material (e.g., metallic alloys such as stainless steel, Al—Si alloys, etc.) or may be at least partially coated with a conductive material. The cavity may have a rectangular shape (e.g., cavity 200 illustrated in FIG. 2A), a cylindrical shape, or may have any other suitable shape. For example, the cavity may take a shape of a cooking oven for cooking food, a cylindrical tank for processing liquids, an industrial furnace for curing polymers or sintering parts, a pipe comprising flowing fluids or gasses, etc. In some embodiments, the cavity may hold an object to be processed in the cavity. An object may include a liquid, semi-liquid, solid, semi-solid, or gas, depending upon the particular process utilized. The object may also include composites or mixtures of matter in differing phases. Thus, by way of non-limiting example, the term object may encompass such matter as food to be defrosted or cooked; clothes or other wet material to be dried; frozen organs to be thawed; chemicals to be reacted; fuel or other combustible material to be combusted; hydrated material to be dehydrated, gases to be expanded; liquids to be heated, boiled or vaporized, or any other material for which there is a desire to apply, even nominally, electromagnetic energy.

In some aspects, the disclosure involves apparatuses for applying radio frequency (RF) energy. The term RF energy, as used herein, includes energy deliverable by electromagnetic radiation in a wavelength (in free space) of 100 km to 1 mm, which corresponds to a frequency of 3 KHz to 300 GHz, respectively. In some examples, the term RF energy is used herein to include energy deliverable by electromagnetic radiation in a wavelength (in free space) of 1 m to 30 mm, which corresponds to 300 MHz to 10 GHz, respectively. In some other examples, the applied RF energy may fall within frequency bands between 500 MHz to 1500 MHz or between 700 MHz to 1200 MHz or between 800 MHz to 1 Hz. Microwave energy and ultra high frequency (UHF) energy, for example, are both within the RF energy range. In some other examples, the applied electromagnetic energy may fall only within one or more Industrial, Scientific and Medical (ISM) frequency bands, for example, between 433.05 MHz and 434.79 MHz, between 902 MHz and 928 MHz, between 2400 MHz and 2500 MHz, and/or between 5725 MHz and 5875 MHz. The invention is not limited to any particular portion of the RF energy spectrum.

Some embodiments may include a radiating element for applying electromagnetic energy (e.g., RF energy) to a cavity. The radiating element may be located in the cavity such that RF energy may be applied from the radiating element to the interior part of the cavity. The radiating element may include an antenna. The radiating element may be configured to carry or emit RF power having power levels suitable for RF heating, for example, power levels of 50 W, 100 W, 500 W, 1000 W, or intermediate power levels. Accordingly, in some embodiments, the radiating element may include portions having thickness (e.g., when a portion is of a slab shape) or diameter (e.g., when a portion is of a wire shape) of 1 mm or more, for example, 2 mm, 3 mm, or 4 mm, etc.

The radiating element may include a feeding section configured to feed RF energy to the radiating element. The feeding section may be in electrical communication with a power feed (e.g., an RF source—also referred to as a "source"). The power feed may supply RF energy to the radiating element. The feeding section may include two subsections. A first subsection may comprise a connecting element (e.g., a screw, a lock, a clip, etc.) for connecting the radiating element to a feeding line or connecting the power feed to the radiating element. A second subsection may be configured to deliver the RF energy from the first subsection to other parts of the radiating element. The first and/or second subsections may have a wire shape, a slab shape, or any other suitable shape. The first and/or second subsections may be made of a conductive material (e.g., a metallic material). The feeding section, its first subsection and/or its second subsection may each be sized to carry or emit RF power having power levels suitable for RF heating, for example, power levels of 50 W, 100 W, 500 W, 1000 W, or intermediate power levels. Accordingly, in some embodiments, the feeding section, its first subsection and/or its second subsection may have a thickness (in case of a slab shape) or diameter (in case of a wire shape) of 1 mm or more, for example, 2 mm, 3 mm, or 4 mm, etc.

The radiating element may further include a grounding section. The grounding section may have a wire shape, a slab shape, or any other suitable shape. The grounding section may be grounded to the cavity (e.g., DC grounding). In some embodiments, the grounding section may be connected to the cavity through a grounding terminal. The grounding section may be made of a conductive material (e.g., a metallic material). The grounding section may be sized to carry or emit RF power having power levels suitable for RF heating, for example, power levels of 50 W, 100 W, 500 W, 1000 W, or intermediate power levels. Accordingly, in some embodiments, the grounding section may have a thickness (in case of a slab shape) or diameter (in case of a wire shape) of 1 mm or more, for example, 2 mm, 3 mm, or 4 mm, etc. In some embodiments, the feeding section and the grounding section may extend substantially within a same plane, which can be referred to as the first plane. The feeding section may extend along a direction, which can be referred to as the first direction, substantially parallel to the grounding section. In some embodiments, directions may be considered substantially parallel if an angle between them is smaller than 15°, 10°, or 5°. The feeding section and the grounding section may be considered to extend substantially within a same plane if they are substantially parallel to each other.

In some embodiments, the grounding section may enhance the overall safety of the apparatus. For example, the grounding section may reduce or eliminate the risk of experiencing electrical shock due to accidental touching of the radiating elements. In a cooking oven application, for instance, a user may accidently touch one or more radiating elements. A grounding section in the radiating element may maintain an electric neutral condition of the radiating element, thereby reducing or eliminating the risk of experiencing an electrical shock.

The radiating element may include a radiating section in electrical communication with the feeding section and the grounding section. The radiating section may have a wire shape, a slab shape, or any other suitable shape. The radiating section may be made of a conductive material (e.g., a metallic material). The radiating section may be sized to carry or emit RF power having power levels suitable for RF heating, for example, power levels of 50 W, 100 W, 500 W, 1000 W, or intermediate power levels. Accordingly, in some embodiments, the radiating section may have a thickness (in case of a slab shape) or diameter (in case of a wire shape) of 1 mm or more, for example, 2 mm, 3 mm, or 4 mm, etc. The radiating section may include at least one bend between the feeding section and a distal end of the radiating section. The at least one bend may be extended in a plane, which can be referred to as the second plane, different from the first plane containing the feeding section and the grounding section, in some embodiments, the second plane in which the at least one bend is extended is substantially perpendicular to the first plane containing the feeding section and the grounding section. In some embodiments, planes or directions may be considered substantially perpendicular to each other if an angle between them is of 90°±15°, for example, between 80° and 100°. The radiating section may comprise a segment extending along a direction, which can be referred to as the second direction, substantially perpendicular to the first direction in which the feeding section extends.

Figure 1A:
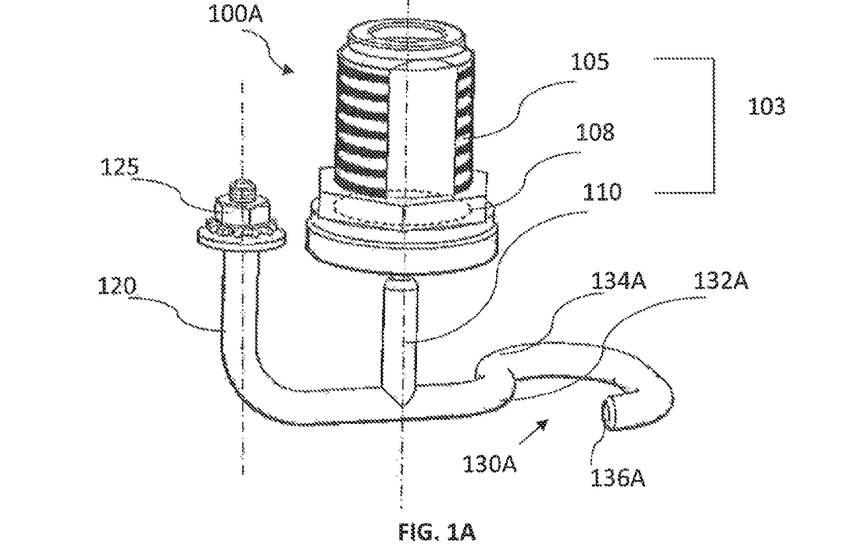
FIGS. 1A-1D are diagrammatic representations of radiating elements, in accordance with some embodiments of the invention.
Figure 1B:
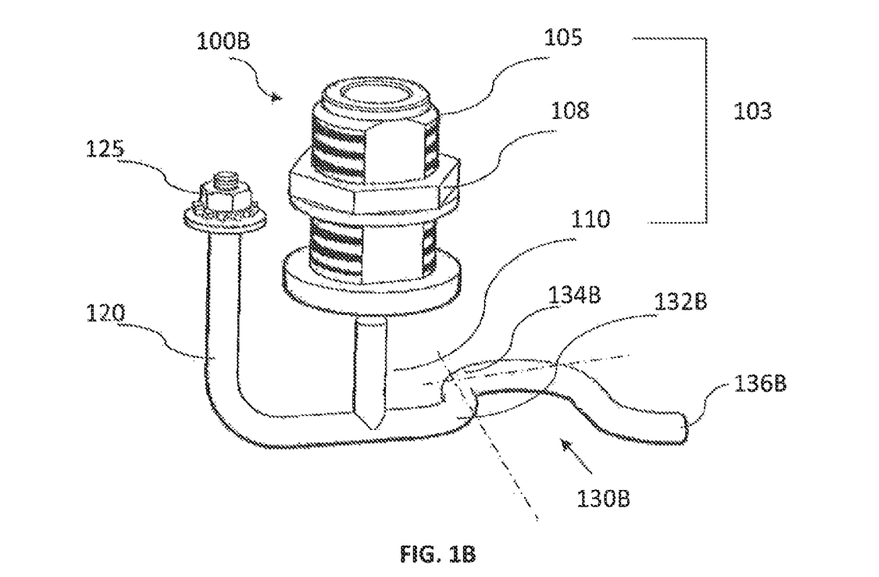
Figure 1C:
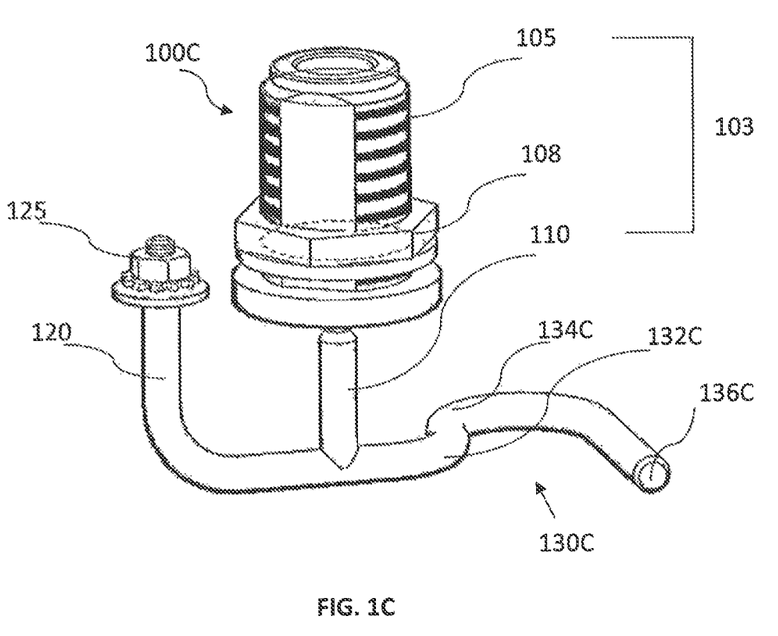

As described in more detail in reference to FIGS. 1A, 1B, and 1C, in some embodiments, the at least one bend in the radiating section may include a first bend that extends through an angle of at least 90 degrees. The at least one bend may further include a second bend that extends through an angle of at least 90 degrees. The angles through which each of the first and/or second bends extends may have other values either higher than 90 degrees (e.g., 110, 120, 150 degrees, etc.) or lower than 90 degrees (e.g., 30, 45, 60, 75 degrees, etc.). In some embodiments, the at least one bend may include a plurality of bends that together extend through an angle of at least 180 degrees or at least 270 degrees. In some embodiments, the first bend and the second bend may together form a curved shape, for example, the shape of a question mark.

In some embodiments, the at least one bend may be configured to change a direction of an electrical current flowing in the radiating section such that the electrical current flows within a second plane different from the first plane containing the feeding section and the grounding section. The electrical current flowing in the radiating section may cause the excitation of a variety of EM modes (e.g., patterns of EM fields resulting from standing waves and/or propagating waves) having different orders at different directions. This may result in a multimode EM excitation in the cavity.

The at least one bend may include a first bend and a second bend each configured to change the direction of the electrical current flowing in the radiating section by an angle of at least 90 degrees. In some embodiments, the at least one bend may include a plurality of bends configured to change the direction of the electrical current flowing in the radiating section by a total angle of at least 180 degrees or 270 degrees. A radiating element as described above may be referred to herein as a modified inverted F antenna.

Some embodiments may include a cavity for processing an object located in the cavity using RF energy. The cavity may comprise a plurality of radiating elements according to any of the embodiments disclosed above. The radiating elements may be configured to receive electromagnetic energy from one or more RF sources and radiate RF energy (e.g., at one or more frequencies) into the cavity. The radiated RF energy may generate one or more electromagnetic field patterns in the cavity (e.g., corresponding to the one or more frequencies). RF energy, in the form of RF waves, radiated from each of the radiating elements located in the cavity may be emitted at a particular time, at a particular frequency, and having a particular amplitude. The parameters including the time, the frequency, and/or the amplitude that characterize the RF waves may be collectively referred herein as an "emission."

The plurality of radiating elements may be of the same structure and/or dimensions or may have different structures and/or dimensions. The plurality of radiating elements may radiate electromagnetic waves having the same bandwidth or different bandwidths. When two or more radiating elements are located in a cavity, RF energy may be emitted from the two or more elements at the same frequency (e.g., coherent RF energy). In some such embodiments, a phase difference may be set between each pair of emissions. In some embodiments, the phase difference may be fixed, e.g., by placing different radiating elements at different electrical distances between the radiating elements and a common power feed. In some embodiments, the phase difference may be dynamically controlled, e.g., by a phase shifter. Additionally or alternatively, RF energy may be applied through two or more of the radiating elements at the same frequency but with different power (or amplitude). The field pattern excited in the cavity may be related to at least one of: the number of radiating elements selected to apply RF energy, the frequency or frequencies at which RF waves are applied, a phase difference between at least two emissions, or the amplitude of each emission.

In some embodiments, a phase difference may be set (applied) between two RF waves at the same frequency and excited simultaneously (e.g., coherent RF waves) from at least one pair of radiating elements from the plurality of radiating elements included in the cavity. Setting different phase differences between different pairs of radiating elements may cause the excitation of different field patterns at a single frequency. In some embodiments, the phase differences may be selected (determined) based on electromagnetic (EM) feedback received from the cavity. In some embodiments, the EM feedback may be obtained by applying a plurality of RF waves to the cavity at a plurality of phase differences. The EM feedback may include signals returning from the cavity to the radiating elements. For example, some RF power applied to the cavity through a certain radiating element may return to the radiating element through which it was applied. Such returning power may constitute the EM feedback or may be included in the EM feedback. Similarly, some of the power applied by the radiating element may be received by other radiating elements. Such received power may also be included in the EM feedback.

In some embodiments, an apparatus for applying RF energy to process an object may include a cavity comprising at least one radiating element as disclosed above. In some embodiments, the cavity may include additional radiating elements of different types or structures. The apparatus may include at least one RF source configured to supply RF energy to the at least one radiating element. An RF source may include any component(s) that may be suitable for generating and supplying electromagnetic energy. For example, the RF source may include one or more of power suppliers configured to generate RF waves that carry electromagnetic energy. For example, the power supplier may include a magnetron configured to generate high power microwaves at a predetermined wavelength or frequency. Alternatively or additionally, the power supplier may include a semiconductor oscillator, e.g., a voltage controlled oscillator, configured to generate AC waveforms (e.g., AC voltage or current) with a controllable frequency. Still alternatively or additionally, the power supplier may include a direct digital synthesizer (DDS). Alternatively or additionally, a source of electromagnetic energy may include any other power supplies, e.g., an electromagnetic field generator, an electromagnetic flux generator, a solid state power amplifier or any mechanism for generating vibrating electrons. The frequency of the waveforms may be controlled to be constant or to vary. AC waveforms may include sinusoidal waves, square waves, pulsed waves, triangular waves, or any other types of waveforms with alternating polarities.

In some embodiments, the apparatus may further include a controller or a processor configured to control the RF energy application to the cavity. The controller may include any electrical circuit that performs a logic operation on input or inputs. For example, the controller may include one or more integrated circuits, microchips, microcontrollers, microprocessors, all or part of a central processing unit (CPU), graphics processing unit (CPU), digital signal processor (DSP), field-programmable gate array (FPGA) or other circuits suitable for executing instructions or performing logic operations. The instructions executed by the controller may, for example, be pre-loaded into a memory unit integrated with or embedded into the controller or may be stored in a separate memory unit, such as a RAM, a ROM, a hard disk, an optical disk, a magnetic medium, a flash memory, other permanent, fixed, or volatile memories, or any other mechanism capable of storing instructions for the controller. The separate memory unit may or may not be a part of the controller. The controller may be customized for a particular use, or can be configured for general-purpose use and can perform different functions by executing different software.

In some embodiments, the controller may control the EM energy (e.g., RF energy) application. In some embodiment, the controller may control the EM energy based on an EM feedback detected from the cavity. For example, the controller may control (e.g., select) the frequency radiated from each of the radiating elements located in the cavity. In some embodiments, the controller may control a single radiating element to radiate EM waves at a single frequency. In some embodiments, the controller may control a plurality of radiating elements to radiate EM waves at the same frequency or at different frequencies. For example, at least two of the plurality of radiating elements may be controlled to radiate EM waves at different frequencies. Additionally or alternatively, the controller may control at least one radiating element to radiate EM waves at multiple frequencies. In some embodiments, the controller may control an RF source to sweep through a plurality of frequencies, with each frequency supplied to at least one of the radiating elements. The sweeping operation may be conducted in a synchronized manner (e.g., at least two radiating elements receive and/or radiate EM waves with the same sweeping frequency simultaneously) or in an unsynchronized manner. In some embodiments, the controller may determine (e.g., select) one or more frequencies to be radiated to the cavity based on one or more EM feedbacks.

In some embodiments, the at least one controller may determine a phase difference between two RF waves sharing the same frequency and radiated simultaneously from at least a pair of radiating elements from the plurality of radiating elements. The controller may determine a constant phase difference between the two RF waves or may change the phase difference in order to change the field pattern excited in the cavity. The controller may control an RF source or a pair of RF sources to supply RF energy to the pair of radiating elements, at multiple phase differences. The controller may conduct a sweep over multiple phase differences, e.g., to obtain an EM feedback. In some embodiments, the controller may determine a phase difference to be applied based on the EM feedback.

As used herein, a sweep may include, for example, a sequential application of RF energy at more than one frequencies and/or phase differences. For example, a sweep may include the sequential application of energy at multiple frequencies in one or more contiguous frequency bands and/or the sequential application of energy at multiple frequencies in more than one non-contiguous frequency band. In some embodiments, a sweep may include the sequential application of energy at multiple frequencies, and at each frequency, all radiating elements simultaneously emit EM radiation at the same frequency and the phase differences between each pair of radiating elements are the same. In other embodiments, a sweep may include the sequential application of energy at multiple frequencies, and at each frequency, all radiating elements simultaneously emit EM radiation at the same frequency but the phase differences between each pair of radiating elements are changing (e.g., changing sequentially). The sweep involving sequential change of two parameters (e.g., frequency and phase difference) can be referred to as two-parameter sweep.

In some embodiments, during a sweeping process, the at least one controller may regulate the energy supplied from the RF source(s) to each of the radiating elements to sequentially apply RF energy at various frequencies and/or phases to the cavity. For example, the controller may adjust the power level and/or the time duration in which the power is applied from each radiating element at a particular frequency and/or phase difference.

In some embodiments, energy may be adjusted according to EM feedback received from the cavity during RF energy application. The EM feedback may include one or more detectable parameters of RF emission (radiation). The RF emission may include emission into the cavity. Such emission may be controlled by the controller. In some embodiments, feedback may be used to ascertain how well the controller controls the emission or if the controller controls the emission satisfactorily. Additionally or alternatively, the RF emission may include emission from the cavity to one or more radiating elements. While some of the emission applied into the cavity may be absorbed in the cavity (e.g., by the object), some of the emission may be emitted out of the cavity, for example, through one or more radiating elements. The emission applied into the cavity and emission emitted out of the cavity may be measured, and difference between emission applied into the cavity and emission emitted out of the cavity racy be used to determine control of further RF emission. For example, if it is noted that almost all the emission applied into the cavity at a certain frequency is emitted out of the cavity through the radiating elements, this frequency may be omitted in future RF energy application, e.g., for a predetermined time period. Some parameters that may be included in the feedback may include: power, frequency, energy, current, voltage, phase differences, etc. In some embodiments, a detector may be associated with at least one of the radiating elements located in the cavity. The detector may comprise a directional coupler. The detector may be configured to measure or detect one or more parameters associated with the radiating element, for example, the energy emitted from the radiating element ("emitted energy"). In some embodiments, the detector may be configured to measure or detect an amount of energy (or power) reflected back to the radiating element as a result of RF energy emission from the radiating element ("reflected energy"). Additionally or alternatively, the detector may be configured to measure or detect an amount of energy (or power) coupled to the radiating element from other radiating elements) ("coupled energy"). The EM feedback may include or may be used to calculate a value indicative of energy absorbable by an object in the cavity. A value indicative of energy absorbable by the object may include any measured or calculated value that is indicative of the ability of an object placed in the cavity to absorb RF energy. For example, the value may include or may be derived from a power reflected back from the cavity as a result of an emission from at least one radiating element. The power reflected may be equal to the power supplied front a source to the radiating element minus the power absorbed by the object or a load (a load may include the object and other elements in the cavity that absorb RF energy). The value may be derived through any mathematical manipulation on the power supplied and the power reflected. The value may include at least one of the Scattering parameters (the reflection/transmission coefficients) or any mathematical manipulation of the Scattering parameters.

A radiating element according to some embodiments of the invention may be configured to radiate RF energy to process an object placed in the cavity, such that an input impedance of the radiating element matches an impedance of the cavity holding the object. A good matching between input impedance of the radiating element and the impedance of the cavity loaded with the object may increase the percentage of energy dissipated in the object compared to the total energy applied to the cavity. For example, a good matching may result in dissipation of most (e.g., more than 50%) of the energy applied to the cavity in the object. The energy applied to the cavity and the energy absorbed by the object may be calculated using one or more of the measured parameters discussed above (e.g., the emitted energy, reflected energy and coupled energy).

FIGS. 1A-1C illustrate three exemplary radiating elements, in accordance with some embodiments. Radiating elements 100A, 100B, and 100C all have a modified inverted F antenna structure. Each of radiating elements 100A, 100B, and 100C may comprise a feeding section 103. The feeding section may include two subsections: a first subsection 105 comprising a connecting element, which is configured to connect to a source, e.g., through a feeding line; and a second subsection 110 configured to connect to a radiating section 130A. The first subsection 105 may include a connecting element for connecting radiating elements 100A, 100B, or 100C to a feeding line (not shown). The feeding line may be used to transmit RF energy from a power supply (e.g., an RF source) to the radiating element. For example, the feeding line may include a coaxial cable. In some embodiments, the feeding line may be designed to operate at temperatures higher than 250° C. The connecting element may electrically connect a radiating element to a feeding line. In some embodiments, the radiating element may be welded (e.g., by laser welding) to the feeding line. In some embodiments, the radiating element may be connected to the feeding line through other mechanical means, such as a screw-nut 108, as illustrated in FIGS. 1A-1C. In other embodiments, the mechanical means may include a lock, a clip, a washer, or any other suitable connecting elements. Subsection 105 may also be connected to a cavity (e.g., cavity 200 illustrated in FIG. 2B). For example, subsection 105 may be mounted to the cavity using screw-nut 108, illustrated in FIGS. 1A-1C, or any other elements that may mount subsection 105 to the cavity. In some embodiments, subsection 105 may be welded (or soldered) to the cavity. Subsection 105 may be connected to subsection 110. Subsection 110 may have a wire shape (e.g., the axial length of subsection 110 may be substantially larger than a diameter of a cross-section of subsection 110 that is perpendicular to the longitudinal axis of subsection 110) and may feed RF energy from the feeding line to the radiating section 130A of the radiating element.

Radiating element 100A, 100B, or 100C may further include a grounding section 120. Grounding section 120 may have a wire shape and may be connected and grounded to the cavity using, for example, screw-nut 125. In some embodiments, grounding section 120 may be welded or soldered to the cavity. In some embodiments, grounding section 120 may be connected to the cavity through a grounding terminal.

Grounding section 120 and subsection 110 of the feeding section 103 (and in some embodiments also subsections 105 of feeding section 103) may extend substantially within a same plane. The plane may be defined by the two central axes (dot-dashed lines) of grounding section 120 and feeding section 103, as illustrated in FIG. 1A. This plane can be referred to as the first plane for ease of description.

Radiating elements 100A, 100B, and 100C may include radiating sections 130A, 130B, and 130C, respectively. Each of radiating sections (130A, 130B, and 130C) may include a first bend, for example bends 132A, 132B, and 132C, respectively, between feeding section 103 and a distal end (136A, 136B, 136C) of the radiating section. In some embodiments, the radiating section may include a second bend 134A, 134B, and 134C, respectively, between the first bend (132A, 132B, or 132C) and the distal end of the radiating section. Radiating sections 130A, 130B, and 130C may each include a plurality of bends. For example, radiating section 130A includes four bends, as illustrated in FIG. 1A; radiating section 130B also includes four bends, as illustrated in FIG. 1B; and radiating section 130C includes three bends, as illustrated in FIG. 1C. Each of the bends may extend through an angle of at least 90 degrees. In some embodiments, the plurality of bends may form a question mark shape (e.g., FIG. 1A) or a similar curved shape. In some embodiments, the plurality of bends may together extend through an angle of at least 180 degrees or at least 270 degrees. For example, the four bends of radiating section 130A together extend through an angle of about 360 degrees. The for bends of radiating section 130B together extend through an angle of about 360 degrees. The three bends of radiating section 130C together extend through an angle of about 270 degrees. At least one bend of the plurality of bends in each radiating section may extend in a second plane, wherein the second plane is different from the first plane. For example, bend 132A extends into a direction that is off the first plane. In some embodiments, all the bends in a radiating section may extend in the second plane, as illustrated in FIGS. 1A-1C. The second plane may be defined by two axes defining a bend, for example the two axis (dot-dashed lines) defining bend 134B illustrated in FIG. 1B. In some embodiments, the bended structure (e.g., in a curved form) may increase the number of available modes (patterns of RF waves) supported by an apparatus compared to a non-bended configuration (e.g., straight line).

The first and the second planes may be substantially perpendicular to each other, as illustrated in FIGS. 1A-1C. In some embodiments, the first and second planes may form other angles between them, for example, 30 degrees, 45 degrees, 60 degrees, etc. An electrical current flowing in the modified inverted F antenna (e.g., with a bended/curved structure) may progress in three different directions (e.g., three orthogonal directions), causing the excitation of EM modes in three different directions. The three different directions may include one direction of the feeding section and two directions of different portions of the bend or bends.

Figure 1D:
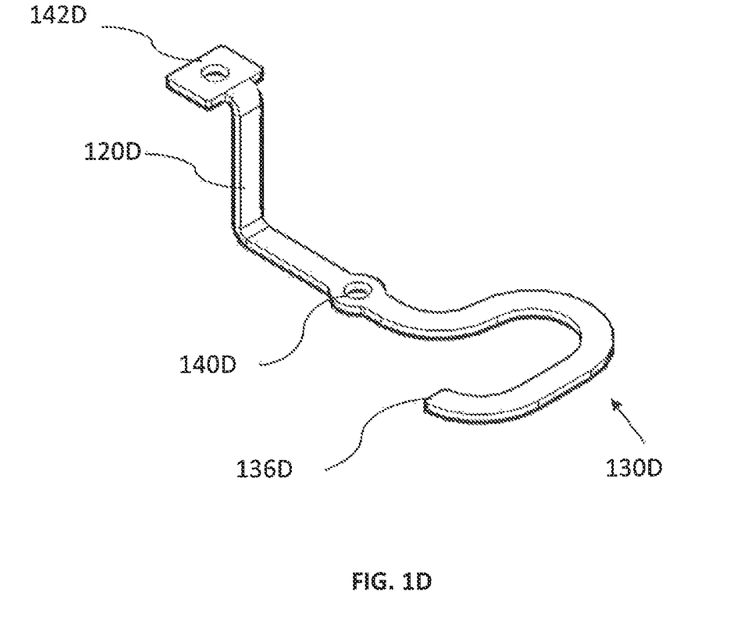
Figure 2A:
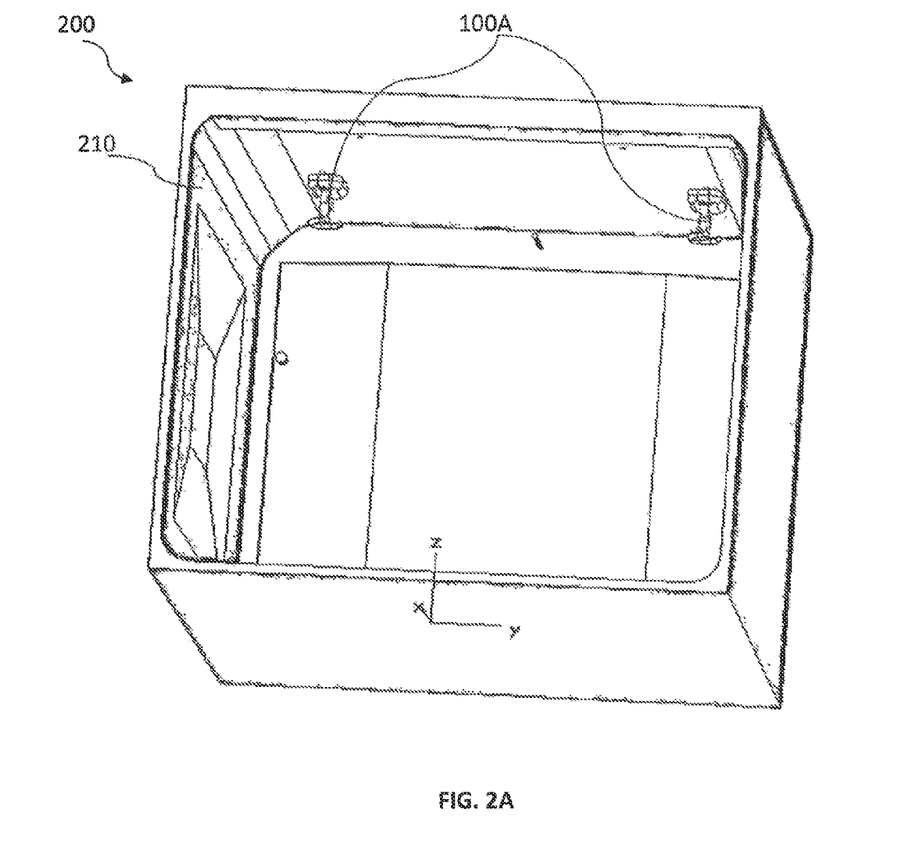
FIG. 2A is a diagrammatic representation of a cavity, in accordance with some embodiments of the invention.

FIG. 1D shows a single slab including a radiating section and a grounding section of a radiating element according to some embodiments, with portions for connecting to a feeding section and to a ground terminal. In FIG. 1D, a grounding section 120D, a radiating section 130D, and a distal end 136D are illustrated. Compared to the embodiments shown in FIGS. 1A-1C, the embodiment shown in FIG. 1D is made of a single slab and has a rectangular cross section. This design may facilitate production and installation of the radiating element. It is noted that other shapes (e.g., triangular, square, elliptical, etc.) of cross sections can also be used. The slab may also include aperture 140D for receiving therein a feeding section and an aperture 142D for receiving therein a screw or other connecting member to connect grounding section 120D to a ground terminal, for example, to a wall of the cavity. FIG. 2A shows an exemplary cavity 200 for processing an object (not shown) placed in the cavity, using RF energy. Cavity 200 includes cavity body 210. Cavity body 210 may be used to hold at least a portion of the object. It is noted that FIG. 2A illustrates an open cavity, but other embodiments may include a closed cavity, e.g., by providing a cavity door (not illustrated). Cavity body 210 may comprise at least one wall constructed from or coated by, a conductive material. For example, cavity body 210 may comprise stainless steel, cast iron, Al—Si alloys, Al—Cu alloys, etc. Cavity body 210 may have a rectangular shape (as illustrated in FIG. 2A), cylindrical shape, or may have any other suitable shape. Cavity 200 may include at least one radiating element. For illustrative purposes, FIG. 2A shows two radiating elements 100A located in the ceiling of cavity 200. It is noted that any number of radiating elements may be included in cavity 200. In addition, any radiating element having any kind of modified inverted F antenna structure may be included in any location of cavity 200, e.g., on the ceiling (as illustrated in FIG. 2A), at the bottom, on an inner wall of the cavity, etc. In some embodiments, radiating elements having more than one kind of structures (e.g., radiating elements 100A, 100B, and 100C) may be included in the same cavity. Cavity wall(s) may be provided with one or more radiating elements having the same structure and/or dimensions or different structures and/or dimensions. In some embodiments, the cavity may also include one or more radiating elements that are not modified inverted F antennas, for example, a monopole, a dipole, etc.

Figure 2B:
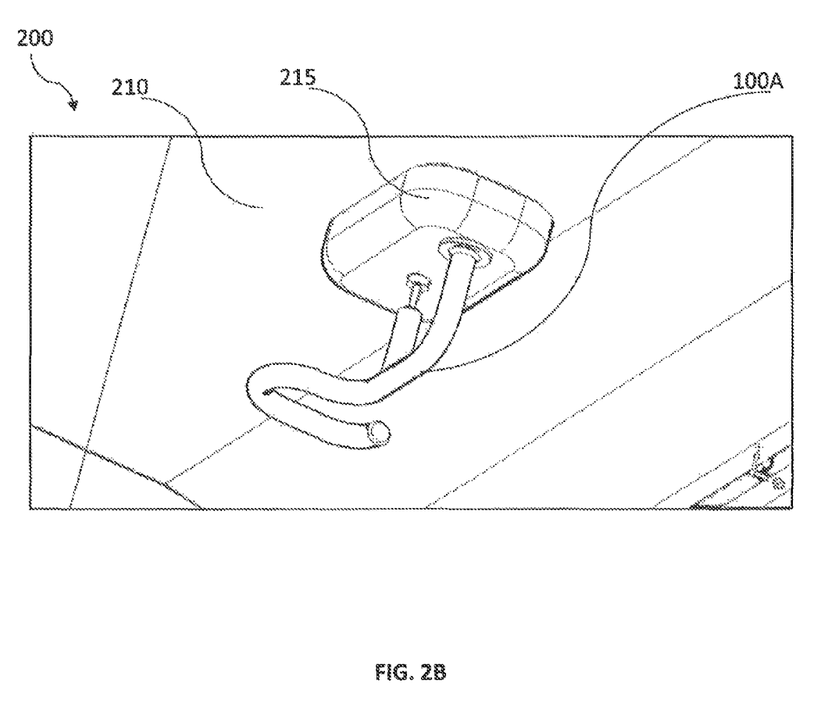
FIG. 2B is a diagrammatic representation of a radiating element located in a cavity, in accordance with some embodiments of the invention.

FIG. 2B illustrates an amplified view of radiating element 100A located in cavity 200. In FIG. 2B, the screw-nuts of element 100A (e.g., screw-nut 108 and 125 in FIG. 1A) are covered by enclosure 215. Enclosure 215 may be attached to cavity 200 or may be part of at least one wall of cavity 200. Enclosure 215 may be electrically conductive. In some embodiments, enclosure 215 may be welded, glued, soldered, screwed, etc. to cavity 200. In other embodiments, enclosure 215 may be cast, forged, stamped, etc. as part of a wall of cavity 200.

In some embodiments, a radiating element having a modified inverted F antenna structure may have a smaller overall size than a basic inverted F antenna (e.g., without the bends). As shown in FIG. 2A, the plurality of bends (e.g., in a curved shape) may reduce the overall size of radiating elements 100A, compared to an antenna having straight wires without these bends (e.g., with the same wire length). The reduced size may allow for holding the radiating element(s) in a smaller space, a feature that may be desirable in some applications.

Additionally, the bended structure may hide sharp edges or tips (e.g., the distal end of the radiating section), by turning these edges or tips into a direction or a location that is not easily accessible, thereby reducing the risk of cutting or sticking a user when be operates an apparatus containing one or more radiating element. This may be desirable in home appliance applications, such as cooking ovens, where a user may be required to reach into the interior of the appliance during normal operations, for example, for cleaning purposes. Thus, in some embodiments, the distal end of the radiating section may point away from the cavity center, for example, towards the wall to which the radiating element is attached.

It is noted that the modified inverted F antenna structure disclosed herein may result in reduced performance in applications where the radiating element is used in open space (e.g., open in the air). The performance gains and various advantages discussed above may be more easily achieved in a closed or partially closed cavity environment.

Figure 3A:
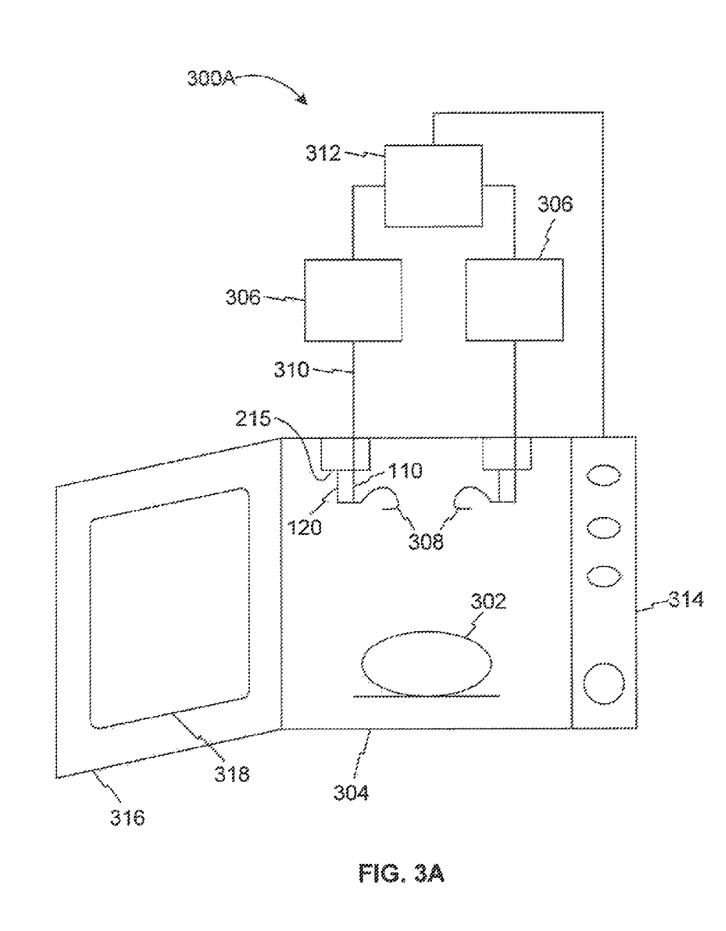
FIGS. 3A and 3B are diagrammatic representations of apparatuses for processing objects by RF energy according to some embodiments of the invention.

FIG. 3A is a diagrammatic illustration of an apparatus 300A for processing an object 302 by application of RF energy to a cavity 304 holding the object. Cavity 304 may support standing electromagnetic waves. For example, apparatus 300A may include one or more sources of RF radiation 306 configured to supply RF energy at a given frequency range (for example, at one or more frequency ranges allocated for industrial, scientific, or medical use). Cavity 304 may support travelling electromagnetic waves in the given frequency range. In some embodiments, both standing and travelling waves in the given frequency range may be supported by cavity 304. Apparatus 300A may further include radiating elements 308, configured to apply RF energy from sources 306 to cavity 304. Radiating elements 308 may be as described above, for example, in the context of FIG. 1A, 1B, 1C or 1D. The bended portions shown in FIG. 3A lie parallel to the back wall of cavity 304 for ease of illustration, but in practice, they may be perpendicular to the back wall of cavity 304. Sources 306 (also referred to as power feeds) may be connected to radiating elements 308 by feeding lines 310, which may include coaxial transmission lines. Sources 306 may be controlled by a controller 312, which may control, for example, transmission frequencies, power levels, phase differences between RF emissions from the two radiating elements, etc. Controller 312 may be connected to a user interface 314, through which a user may provide instructions to the controller, e.g., to the duration of heating, and/or the characteristics of object 302. Controller 312 may determine heating instructions based on the information received from the user via interface 314. Cavity 304 may include a bottom, a ceiling, and side walls. The side walls may include a back wall and a front wall. The front wall may include an opening that may be closed by a door 316. Door 316 may include RF leakage preventing device 318 such as a choke, a gasket, or any other arrangement configured to eliminate or decrease RF leakage through the door when the door is closed.

Figure 3B:
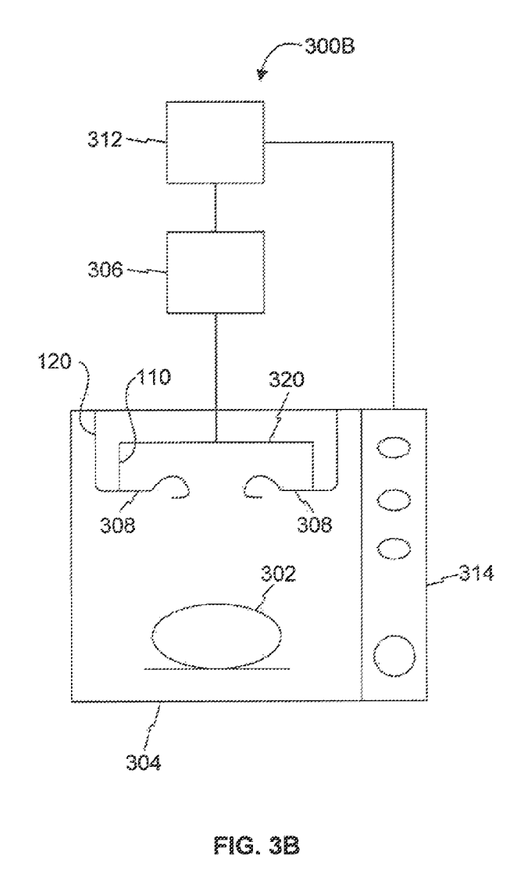

FIG. 3B is a diagrammatical illustration of an apparatus 300B according to some embodiments. Apparatus 300B is similar to apparatus 300A, but has two radiating elements 308 interconnected by a conductor 320 residing inside cavity 304. Thus, the two radiating elements 308 are fed from a common source 306. The two radiating elements 308 may be interconnected, as shown in FIG. 3B, through their respective feeding sections 110. The phase difference between signals emitted by the two radiating elements 308 in FIG. 3B may be set based on different electrical length measured between each of the radiating elements 308 and the common source 306. In FIG. 3B, this difference is set to be about zero. In other embodiments, the difference may be set to other values.

In the foregoing Description of Exemplary Embodiments, various features are grouped together in a single embodiment for purposes of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate embodiment of the invention.

Moreover, it will be apparent to those skilled in the art from consideration of the specification and practice of the present disclosure that various modifications and variations can be made to the disclosed systems or apparatuses without departing from the scope of the invention, as claimed. For example, one or more steps of a method and/or one or more components of an apparatus or a device may be omitted, changed, or substituted without departing from the scope of the invention. Thus, it is intended that the specification and examples be considered as exemplary only, with a true scope of the present disclosure being indicated by the following claims and their equivalents.

The invention claimed is:

1. An apparatus for processing an object by application of radio frequency (RF) energy in a frequency range to a cavity holding the object, wherein the cavity supports at least one of standing or travelling electromagnetic waves in the frequency range at which the RF energy is applied, the apparatus comprising:
   the cavity;
   a radiating element for applying the RF energy from a power feed to the cavity, the radiating element residing inside the cavity and comprising:
   a feeding section;
   a grounding section, wherein the feeding section and the grounding section extend substantially within a first plane; and
   a radiating section in electrical communication with the feeding section and the grounding section, wherein the radiating section is a section of bent wire or bent plate that includes at least one bend between the feeding section and a distal end of the radiating section, the at least one bend extending in a second plane different from the first plane.

2. The apparatus of claim 1, wherein the at least one bend is curved.

3. The apparatus of claim 1, wherein the feeding section extends along a first direction substantially parallel to the grounding section.

4. The apparatus of claim 3, wherein the radiating section comprises a segment extending along a second direction substantially perpendicular to the first direction.

5. The apparatus of claim 1, wherein the second plane is substantially perpendicular to the first plane.

6. The apparatus of claim 1, wherein the at least one bend includes a bend that extends through an angle of at least 90 degrees.

7. The apparatus of claim 1, wherein the at least one bend includes a first bend and a second bend, and the first bend and the second bend together form a curved shape.

8. The apparatus of claim 1, wherein the distal end of the radiating section points away from a center of the cavity.

9. The apparatus of claim 1, wherein the feeding section, the grounding section, and the radiation section are formed as a wire-shaped member.

10. The apparatus of claim 1, wherein the grounding section and the radiating section are formed as a one-piece member.

11. The apparatus of claim 1, wherein the radiating element is configured to carry RF power having a power level of at least 50 W.

12. The apparatus of claim 1, comprising two or more radiating elements connected to a common power feed, and each of the two or more radiating elements comprising:
   said feeding section;
   said grounding section; and
   said radiating section.

13. The apparatus of claim 1, wherein the grounding section and the radiating section are made together of a single bended slab and have a same cross-sectional shape.

14. The apparatus of claim 1, wherein the radiating element is configured to carry RF power having a power level of at least 50 W.

15. A microwave oven radiating element configured to apply into a cavity RF radiation at power of at least 50 W, comprising:
   a feeding section having an elongate shape;
   a bent wire grounding section, wherein the feeding section and the grounding section extend substantially within a first plane; and
   a radiating section in electrical communication with the feeding section and the grounding section, the radiating section being a bent wire comprising at least one bend configured to change a direction of an electrical current flowing in the radiating section such that the electrical current flows within a second plane different from the first plane.

16. The radiating element of claim 15, wherein the at least one bend is curved.

17. The radiating element of claim 15, wherein the at least one bend includes a first bend and a second bend, and the first bend and the second bend together form a curved U-shape.

18. The radiating element of claim 15, wherein the feeding section, the grounding section, and the radiation section have a same cross-sectional shape.

19. The radiating element of claim 15, wherein the grounding section and the radiating section are portions of a one-piece bent member.

20. A microwave heating apparatus for processing an object by application of radio frequency (RF) energy in a frequency range to a cavity holding the object, wherein the cavity supports at least one of standing or travelling electromagnetic waves in the frequency range at which the RF energy is applied, the apparatus comprising:
  the cavity;
  an antenna for applying the RF energy from a power feed to the cavity, the antenna residing inside the cavity and comprising:
    a feeder;
    a ground that is wire-shaped or plate-shaped, wherein the feeder and the ground extend substantially within a first plane; and
    a radiator in electrical communication with the feeder and the ground, wherein the radiator is a section of bent wire or a section of bent plate and includes at least one bend formed by a bent section and located between the feeder and a distal end of the radiator, the at least one bend extending in a second plane different from the first plane.

21. The apparatus of claim 20, wherein the at least one bend is curved.

22. The apparatus of claim 20, wherein the feeder extends along a first direction substantially parallel to the ground.

23. The apparatus of claim 22, wherein the radiator comprises a segment extending along a second direction substantially perpendicular to the first direction.

24. The apparatus of claim 20, wherein the second plane is substantially perpendicular to the first plane.

25. The apparatus of claim 20, wherein the at least one bend includes a bend that extends through an angle of at least 90 degrees.

26. The apparatus of claim 20, wherein the at least one bend includes a first bend and a second bend, and the first bend and the second bend together form a curved shape.

27. The apparatus of claim 20, wherein the distal end of the radiator points away from a center of the cavity.

28. The apparatus of claim 20, wherein the feeder, the ground, and the radiator are wire-shaped and has a same cross-sectional shape.

29. The apparatus of claim 20, wherein the ground and the radiator are a one-piece bent member having an opening for connecting the one-piece bent member to one end of the feeder.

30. The apparatus of claim 20, wherein the antenna is configured to carry RF power having a power level of at least 50 W.

31. A microwave heating antenna configured to apply into a cavity RF radiation at power of at least 50 W, comprising:
  a feeder;
  a bent one-piece member comprising:
    a ground, wherein the feeder and the ground extend substantially within a first plane; and
    a radiator in electrical communication with the feeder and the ground, the radiator comprising at least one bend configured to change a direction of an electrical current flowing in the radiator such that the electrical current flows within a second plane different from the first plane.

32. The antenna of claim 31, wherein the at least one bend is curved.

33. The antenna of claim 31, wherein the at least one bend includes a first bend and a second bend, and the first bend and the second bend together form a curved shape.

34. The antenna of claim 31, wherein the ground, and the radiator have a rectangular cross-section.

35. The antenna of claim 31, wherein the ground and the radiator are are arranged on opposite sides of a connecting portion that connects the bent one-piece member to one end of the feeder.

* * * * *